United States Patent Office 3,738,896
Patented June 12, 1973

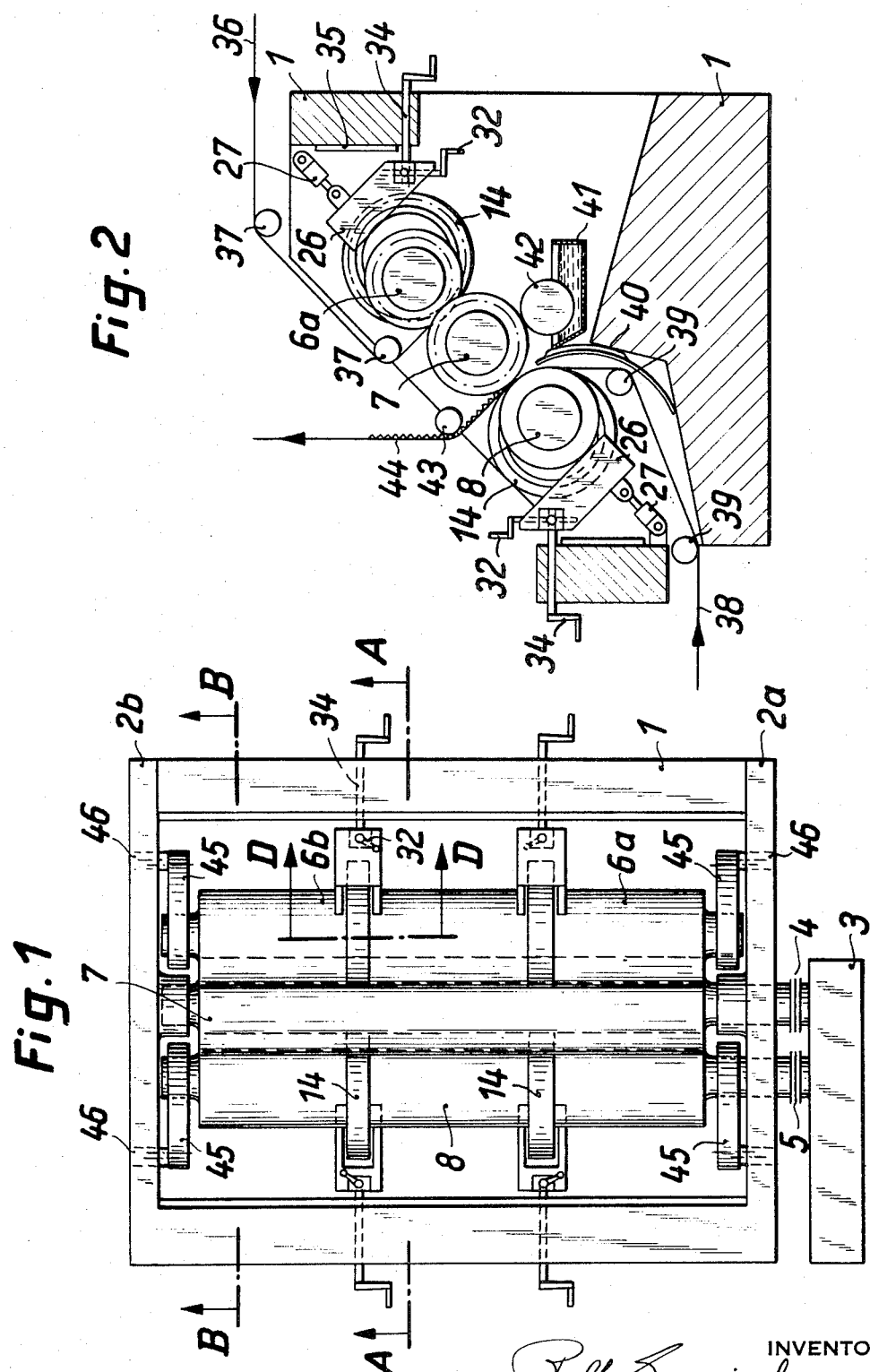

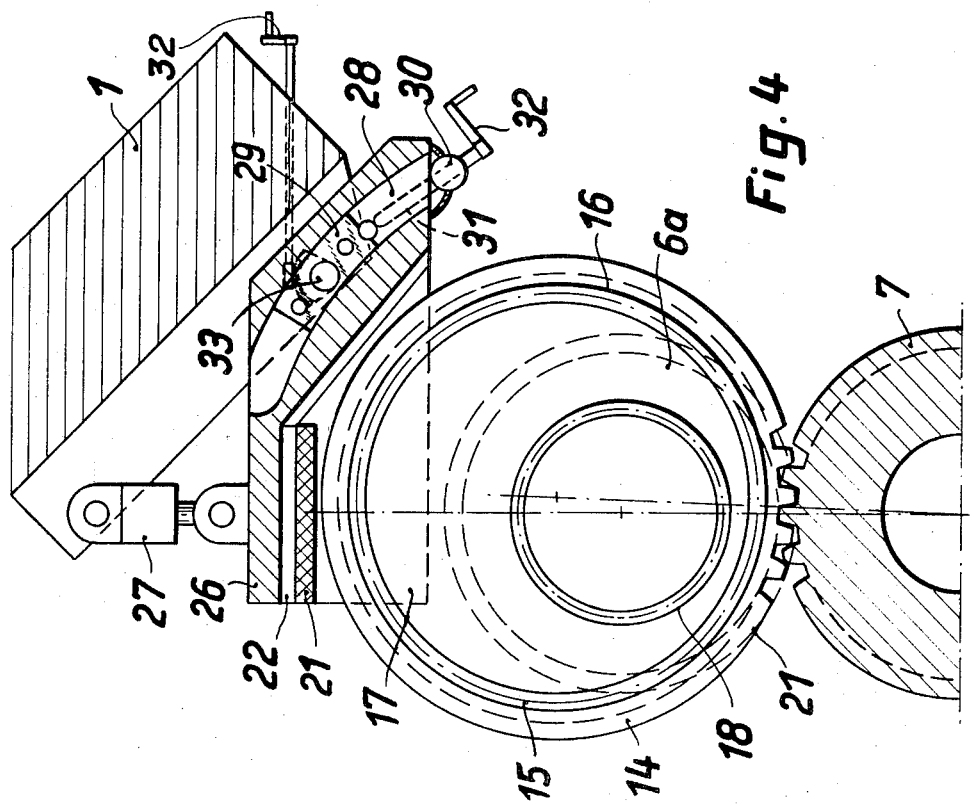
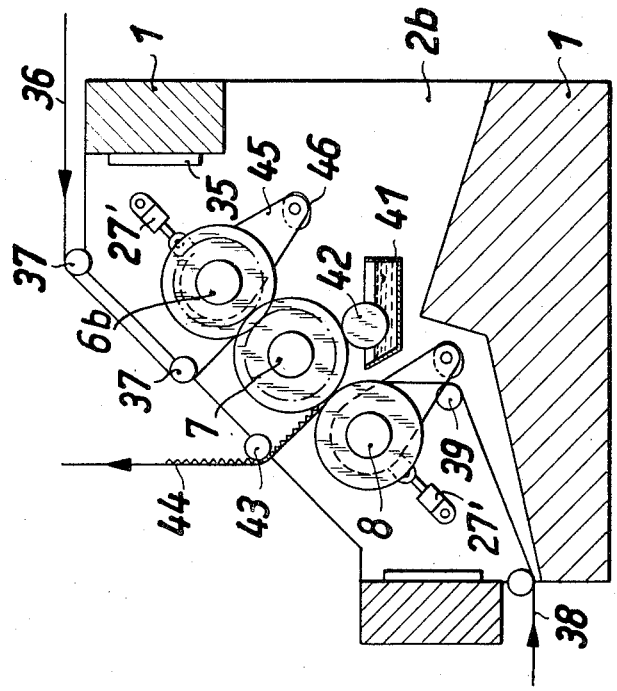

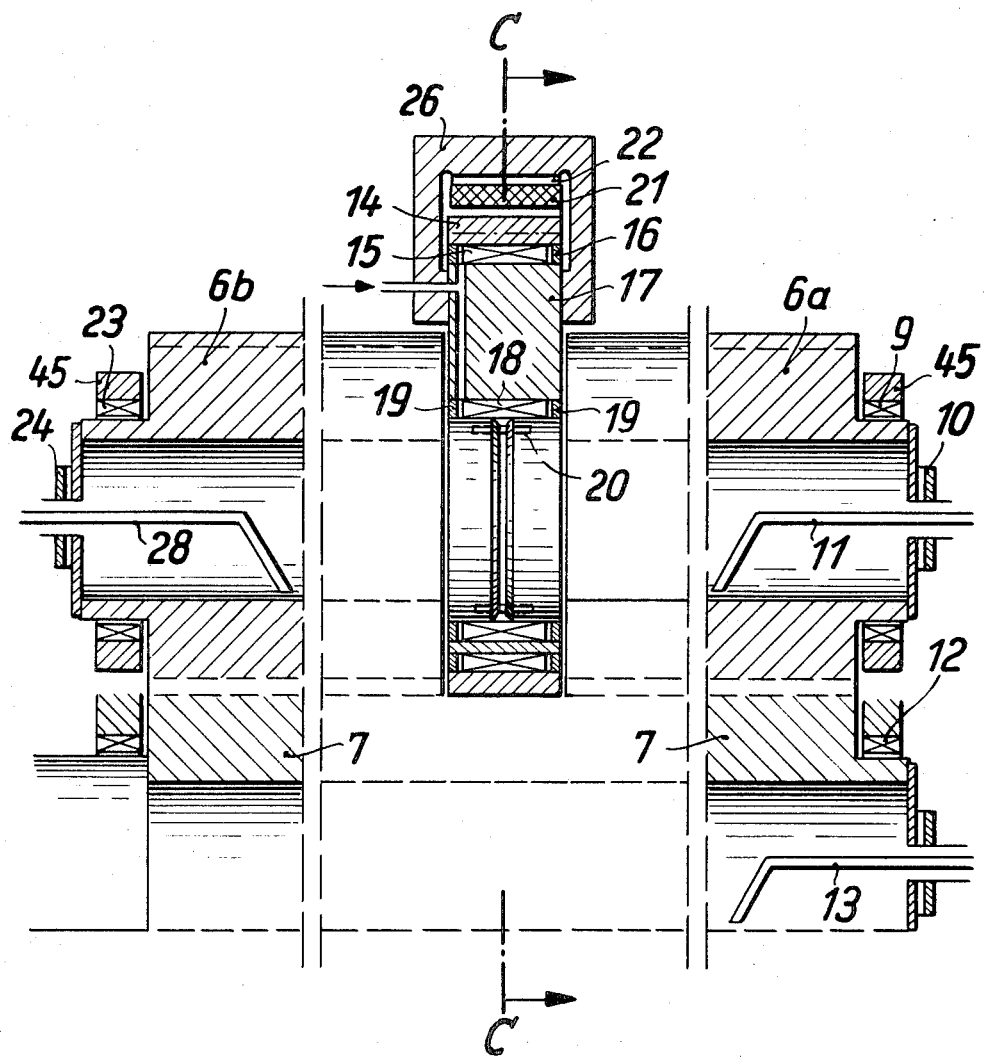

3,738,896
ROLLING MILL FOR PASSING WEBS, ESPECIALLY CORRUGATED CARDBOARD WEBS
Rolf Sonnichsen, Lindenstrasse 62, Wedel, Holstein, Germany
Filed Jan. 20, 1971, Ser. No. 107,899
Claims priority, application Germany, Jan. 31, 1970, P 20 04 483.1
Int. Cl. B31f 1/20; B30b 3/04
U.S. Cl. 156—462
8 Claims

ABSTRACT OF THE DISCLOSURE

Apparatus for rolling web or strip wherein at least a pair of parallel rollers compress the web as it passes therebetween wherein at least one of the rollers is provided with auxiliary bearing structure located intermediate its ends. Such auxiliary bearing structure includes an eccentric element mounted within a recess defined in the roller, and the element is mounted upon the apparatus frame for adjustment in a radial direction. A rolling ring is then mounted upon the eccentric element and the roller ring is of an axial width substantially equal to that of the recess defined in the supported roller wherein the outer periphery of the roller ring coincides with the supported roller surface at the point of roller contact with the web being treated.

BACKGROUND OF THE INVENTION

The invention relates to a rolling mill for rolling and/or embossing continuously passing webs, comprising a continuous center roll cooperating with an upper and a lower roll in such a manner that the webs are continuously passing through the roll gaps and/or may be joined therein.

Such rolling mills serve for rolling and/or embossing materials of different thicknesses and strengths with an exactly uniform thickness and, if desired or required, joining them to each other by pasting or other processes.

It is necessary with such rolling mills that the roll clearances have a uniform dimension over their entire length with very narrow tolerances. In particular, they must not show any gap differences from the fact that the rolls elastically deflect lengthwise caused by the rolling pressure. Nor are the rolls permitted to perform any flexural vibrations during the working operation. Such vibrations must be avoided, in particular, when sections are embossed with a periodically returning pattern.

It is known to provide one roll or both rolls of a pair of rolls working against each other with a bulging, that is with a suitably parabolically shaped camber, please see amongst others: Lueger: "Lexikon der Fertigungstechnik und Arbeitsmaschinen" (Lexicon of manufacturing technique and machines), vol. 9, Deutsche Verlagsanstalt Stuttgart 1968, page 477. But this suffers from the drawback that for processing materials of different strength or dimensions, a different chamber will be required which results in inventory costs and frequent roll changes.

It is also known to compensate for the deflection of the rolls by arranging them obliquely. This method, however, cannot be applied to sectioned embossing rolls, is less accurate and calls for expensive bearing constructions.

Finally, it is also known to counteract the roll deflection by inclined spanning of the bearings. This method is disadvantageous because it causes very high bearing pressures and requires heavy constructions.

It is also known already to arrange supporting rolls to support the working roll against deflection. This however leads to very expensive constructions. If one replaces a supporting roll by shorter supporting rollers the danger exists that these rollers are impressed on the material of the roll thus impairing the surface of the roll and, in particular, the embossing profiles.

Attempts have also been made to arrange supporting structures, supporting rollers of supporting rolls within the roll to be protected against deflection. These rollers or rolls, of course, must have a smaller diameter than the roll proper and therefore they are not very well suited to serve their purpose. They are also accessible only with difficulty and constitute an obstruction in case the rolls are tempered from inside, for example.

It is an object of the invention to eliminate the disturbing influence of the roll deflection in a rolling mill in such a manner that a uniform roll gap is guaranteed and working free from roll vibrations is possible. It is another object to obtain the uniform roll gap without inner nor outer supporting means for the rolls. A further object is to compensate for the deflection of the medium roll which is supported in the usual manner.

SUMMARY OF THE INVENTION

In accordance with the invention, the upper and lower rolls respectively consist of several roll sections with a rolling ring arranged therebetween in such a manner that a continuous roll gap is formed. The rolling ring is supported on an eccentric and the eccentric in turn is supported by the inner bearing journals of said roll sections.

In a further embodiment of the invention, the outer bearing journals of two roll sections are displaceably supported in the cheeks of the rolling mill. Their inner bearing journals, however, are supported in a twin bearing arranged in the eccentric. The periphery of the eccentric carries the bearing for the rolling ring. The eccentric is retained by means of an eccentric holder. The eccentric holder is iased on the one hand by a pressure device. On the other hand, it is connected with a link in which a sliding block may be displaced by rotation of a spindle. The sliding block in its turn may be re-adjusted by displacement via an eccentric roll. The eccentric roll is fixedly supported at the machine body.

In accordance with another embodiment of the invention the upper and lower rolls are subdivided each in more than two roll sections, with a rolling ring respectively disposed between every two adjacent roll sections.

In a further embodiment of the invention, the rolls may be provided with a small camber, i.e. a bulging of the roll surface.

In a special embodiment of the invention, the upper and center rolls are provided with mutual counter profiles. An adhesive applicator is arranged at the center roll. Guiding rollers for a covering web are provided at the lower roll. A guiding roll for the finished web is arranged in rear of the roll gap formed between the lower and center rolls. This embodiment may be used for the fabrication of corrugated cardboard.

The advantage of the invention consist in that a uniform roll gap is obtained which is not impaired by any deflection of the rolls. Owing to the subdivision of the rolls into roll sections which bear against deflection with their full diameter with the gaps formed between them closed by rolling rings, deflection is reduced to a generally negligible degree which, if necessary, may be reduced still further by a very slight camber. In the same way the tendency of the rolls to vibrate is eliminated. In this construction there are no supporting means used whatsoever which would render the interior of the rolls inaccessible for mounting any tempering devices therein. It is possible with the eccentric arrangement of the invention to adjust the rolls easily and irreproachably from outside by the actuation of cranks.

It is in particular possible with the machine of the invention to fabricate corrugated board in which process accuracy of roll gap and freedom from vibrations are known to be of special importance.

BRIEF DESCRIPTION OF THE DRAWING

The drawings show by way of example one embodiment of the invention. In the drawings, FIG. 1 shows a plan view taken on the rolling mill according to the invention comprising an upper and a lower roll each composed of three roll sections and a continuous center roll, FIG. 2 shows a cross-sectional view taken on line A—A of FIG. 1, FIG. 3 shows a cross-sectional view taken on line B—B of FIG. 1, FIG. 4 shows a cross-sectional view taken on line C—C of FIG. 5, and FIG. 5 shows a longitudinal sectional view taken approximately on line D—D of FIG. 1 with the upper roll shown to comprise only two roll sections for the sake of simplicity.

DESCRIPTION OF THE PREFERRED EMBODIMENT

The machine housing 1 of the rolling mill according to the invention is closed by two cheeks 2a and 2b. A center roll 7 and a lower roll 8 are respectively driven through couplings 4 and 5 by a driving unit 3.

The upper roll is composed of roll sections. In accordance with FIG. 1 the upper and lower rolls may consist of three roll sections. But they may also consist of two roll sections as shown in FIG. 5. Two of these roll sections are designated as 6a and 6b. The continuous center roll 7 is supported between the cheeks 2. The roll section 6a of the upper roll is supported in a bearing 9 of the rocker bar 45 in the cheek 2a of the machine housing 1; the rocking arm will be dealt with in more detail below. A sealing 10 is disposed in the bearing for the supplied tempering medium which is passed through the center passage 11 into the interior of roll 6a. The center roll 7 is supported in the bearing 12. This roll, too, is provided with a tempering medium supply device 13. The lower roll 8 as regards its construction and bearings essentially corresponds to the upper roll 6, that means it is also a multiple-section roll.

Between the roll sections 6a and 6b of the upper roll (FIG. 5) a rolling ring 14 is adapted to run on a bearing 15 which is laterally sealed by bearing sealings 16. Bearing 15 is arranged on the stationarily supported eccentric 17. The bearing journals of the roll sections 6a and 6b are projecting into a bore arranged in the eccentric 17 and are supported therein by means of a twin bearing 18. The bearing 18 is likewise provided with lateral sealings 19. The bearing journals of the upper roll sections 6a and 6b may be coupled by means of coupling pins 20. For the bearings 15 and 18 there is provided a grease device as indicated in FIG. 5 by the arrow.

The rolling ring 14 is tempered by a tempering device 21. The tempering means 21 is thermally shielded on its back side against the remaining machine parts by means of a cooling device 22. The upper roll section 6b is supported at its other ends in a bearing 23 provided in a rocker bar 45 which is pivotally mounted at the cheek 2b of the machine body 1 (please see FIG. 1). The section 6b is also tempered by means of a tempering device 25 sealed by a sealing 24.

The eccentric 17 (FIG. 4) is mounted on an eccentric holder 26. A pressure exerting device 27 shown in this embodiment as a hydraulic cylinder is pivotally connected at its one end by joints at the eccentric holder 26 and at its other end at the machine body 1.

The eccentric holder 26 carries a link 28 in which a sliding block 29 is adapted to slide on a circular path the center point of which is disposed on the axis of the roll sections 6a and 6b. The eccentric holder 26 carries furthermore a spindle nut 30 which is in engagement with a sliding block spindle 31. If the crank handle 32 of this spindle is turned, then the sliding block 29 will slide along said path thereby rotating the eccentric 17 about the axes of the roll sections 6a and 6b. A shaft 33 supported in the machine body 1 is adapted to be rotated by means of a crank handle drive 34, and to displace thereby the sliding block 29 and along with it the eccentric holder 26.

A cooler 35 for thermally shielding the machine body 1 with respect to the roll sections 6a, 6b and the rolling ring 14 is provided between said roll sections 6a, 6b, the rolling ring 14 and the machine body (FIG. 2).

The web 36 to be embossed (FIG. 2) runs over guide rollers 37 into the roll gap formed between the upper and the center rolls provided with the embossing profile. At the same time, a covering web 38 runs via guide rollers 39 into the gap between the center roll 7 and the lower roll 8. The latter is thermally shielded against the other machine parts by means of a cooling shield comprising a cooling arrangement 40.

Furthermore an adhesive trough 41 containing an adhesive is provided. This adhesive is transferred on the embossed web 36 by means of a roller 42, so that the web 36 sticks to the covering web 38. The finished web 44 leaves the rolling mill via the guide roller 43.

As already mentioned the lower roll 8 is essentially of the same construction as the upper roll 6. The rocker bars 45 by means of which the rolls 6 and 8 are supported at the cheeks 2a and 2b may be adjusted for each roll separately by eccentrics 46 with respect to the center roll 7.

The inventive advantage and operation of the rolling mill is based on the fact that the two rolls acting against the center roll are sub-divided. Their bearing journals at the division place are supported in a twin bearing provided in the eccentric 17. The latter is retained in the machine housing by means of the pressure device 27 and the means 28 to 33 in such a manner that it may easily be rotated by displacement of the sliding block 29. In this way the distance between the rolling ring 14 supported on the eccentric and the twin bearing 18 of the roll section journals is adjustable. The rolling ring 14 may be adjusted in such a manner that it fills the gap between the roll sections. Owing to this and the other possibilities of adjustment a continuous roll gap is provided. In this roll gap the roll sections and the rolling ring have the same peripheral speed. Owing to this it is possible to roll both smooth and profiled webs.

Owing to the subdivision of the rolls' deflection and any vibration tendencies practically are completely avoided. What remains of these phenomena may be obviated by a bulged roll shape which, however, only needs to be very small. With the rolling mill of the invention, the rolls' interior is accessible to provide tempering means.

The rocker bars 45 are adapted to be swiveled by hydraulically actuated cylinder-and-piston-devices 27 supported at the machine housing which are similarly constructed as the pressure exerting devices 27 and serve to press the upper roll and the lower roll against the center roll (FIG. 3).

What I claim is:

1. An apparatus for rolling a continuous strip of material comprising, in combination, a frame, first and second rollers having outer ends rotatably mounted on said frame and rotatable about substantially parallel, spaced axes, drive means drivingly connected to at least one of said rollers, said first roller comprising at least two coaxial roller portions having adjacent inner ends of reduced diameter defining an annular recess intermediate the outer ends of the associated first roller, an annular cylindrical bearing support element mounted upon said frame and within said recess having a bore eccentrically disposed to its periphery, an annular bearing within said bore located within said recess supporting said roller portions' inner ends upon said bearing support element, and an annular rolling ring rotatably mounted upon said element periphery and located within said recess having an outer cylindrical surface of an axial width substantially equal to the axial width of said recess, said outer roller ring surface coinciding with the surfaces of said roller portions in direct opposed relation to the surface of said second roller.

2. An apparatus for rolling a continuous strip of material as in claim 1, an annular bearing interposed between said cylindrical bearing support element periphery and said annular rolling ring.

3. An apparatus for rolling a continuous strip of material as in claim 1, adjustable rocker members mounted upon said frame rotatably supporting said outer ends of said first roller permitting adjustment of the spacing between the axes of said first and second rollers.

4. An apparatus for rolling a continuous strip of material as in claim 1, adjustable means mounting said annular cylindrical bearing support element upon said frame permitting said element to be moved toward and away from the axis of said second roller.

5. An apparatus for rolling a continuous strip of material as in claim 4 wherein said adjustable means includes means for rotating said cylindrical bearing support element about the axis of said first roller.

6. An apparatus for rolling a continuous strip of material as in claim 4 wherein said adjustable means includes a holder pivotally mounted upon said frame, and extensible means interposed between said frame and said holder for positioning said element with respect to said second roller axis.

7. An apparatus for rolling a continuous strip of material as in claim 6 wherein said holder includes slide means interposed between said holder and said frame permitting said holder to pivot in a circular path concentric to the axis of said first roller for angularly adjusting said element about said axis of said first roller.

8. An apparatus for rolling a continuous strip of material as in claim 1 wherein said first roller includes three coaxial roller portions defining two axially spaced roller portion recesses, and an annular cylindrical bearing support element having an annular bearing supporting said roller portions within each recess, and a rolling ring mounted upon each bearing support element and located within each recess.

References Cited

UNITED STATES PATENTS

| | | | |
|---|---|---|---|
| 3,119,324 | 1/1964 | Justus | 100—170 |
| 2,720,910 | 10/1955 | Rockstrom et al. | 156—472 |
| 2,310,421 | 2/1943 | Greenwood | 156—596 |
| 2,687,165 | 8/1954 | Hollis | 156—596 |
| 3,220,911 | 11/1965 | Werner | 156—470 X |

FOREIGN PATENTS

| | | |
|---|---|---|
| 1,124,675 | 8/1968 | Great Britain. |
| 1,290,038 | 2/1969 | Germany. |

GEORGE F. LESMES, Primary Examiner

J. C. GIL, Assistant Examiner

U.S. Cl. X.R.

100—169; 156—470, 472